United States Patent [19]
Hiratsuka

[11] Patent Number: 5,309,592
[45] Date of Patent: May 10, 1994

[54] CLEANING ROBOT
[75] Inventor: Kazuhiro Hiratsuka, Hirakata, Japan
[73] Assignee: Sanyo Electric Co., Ltd., Osaka, Japan
[21] Appl. No.: 76,754
[22] Filed: Jun. 15, 1993
[30] Foreign Application Priority Data
  Jun. 23, 1992 [JP] Japan .................................. 4-164902
[51] Int. Cl.[5] ...................... A47L 11/16; A47L 11/202
[52] U.S. Cl. ........................................ 15/49.1; 15/319; 901/1; 51/177
[58] Field of Search .................. 15/49.1, 50.1, 98, 319, 15/339; 901/1; 51/177

[56]    References Cited
U.S. PATENT DOCUMENTS
  5,032,775  7/1991  Mizuno et al. ........................ 15/319
FOREIGN PATENT DOCUMENTS
  2225221  5/1990  United Kingdom .................. 15/319

Primary Examiner—Edward L. Roberts
Attorney, Agent, or Firm—Nikaido Marmelstein Murray & Oram

[57] ABSTRACT

A cleaning robot having a robot body to be self-propelled on a floor along a side wall, and a cleaning mechanism mounted on the robot body comprises a steering device provided on the robot body for changing the direction of advance of the robot body, and a slide device mounted on the robot body and reciprocatingly movable toward and away from the side wall. A contact force sensor positionable in contact with the side wall is provided at an outer end of the slide device. Based on the detection signal of the sensor, the slide device is controlled so as to maintain the force of contact at a target value, and the steering device is controlled so that a component of the contact force in the direction of advance of the robot body becomes zero.

4 Claims, 10 Drawing Sheets

CLEANING ROBOT

FIELD OF THE INVENTION

The present invention relates to a cleaning robot for automatically cleaning a predetermined cleaning area while traveling on a floor by itself, and more particularly to a cleaning robot adapted to travel along side walls and obstacles to thereby clean every nook and corner of a cleaning area.

BACKGROUND OF THE INVENTION

FIG. 15 shows a conventional cleaning robot which comprises a robot body 9 provided with drive wheels 92, a cleaning mechanism 91 mounted on the body and a plurality of ultrasonic sensors 93 provided on the outer sides of the body and directed outward.

When a memory card 95 having recorded thereon dimensional data as to the room to be cleaned is inserted into an inlet 94 of the robot body 9, followed by actuation of a start switch 96, the dimensional data is first read from the memory card 95, and a travel path of the cleaning robot is initially set based on the data. The robot body 9 then starts to travel along the path.

During the travel of the robot body 9, the distances from the robot to side walls or obstacles (hereinafter referred to collectively as the side wall) which are present in the cleaning area are measured by the ultrasonic sensors 93, and an internal map is prepared from the measurements. The travel path of the robot is corrected by ensuring a match between the internal map and the path. Consequently, the robot is able to clean the floor while avoiding a collision with the side wall.

With the conventional cleaning robot, however, the detecting ability of the ultrasonic sensors 93 is governed by the material, configuration or the like of the side wall, so that the distances to the side wall detected are likely to involve errors, which make the internal map inaccurate, possibly permitting the robot to collide with the side wall.

Furthermore, the ultrasonic sensors 93 for measuring distances are low in sensitivity to variations in distance, so that there is a need to set the robot at a large distance from the side wall when the robot travels along the side wall. This entails the problem that an area close to the side wall remains uncleaned.

SUMMARY OF THE INVENTION

An object of the present invention is to provide a cleaning robot which is adapted to travel along side walls as positioned at the smallest possible distance therefrom so as to completely clean an area close to the side wall.

With the cleaning robot of the present invention, the robot body is provided with a steering device for changing the direction of advance of the robot body, and a slide device reciprocatingly movable toward and away from a side wall.

At an end of the slide device, a contact force sensor is provided which contacts the side wall for detecting the force of contact exerted on the sensor by the side wall.

The cleaning robot further has slide control means for controlling the slide device based on a detection signal from the contact force sensor so as to maintain the contact force at a target value or at a value within a target range, and steering control means for controlling the steering device based on the detection signal from the contact force sensor so that a component of the contact force in the direction of advance of the robot body becomes zero.

During the travel of the body of the cleaning robot along a side wall, the contact force sensor is in direct contact with the side wall to detect the force of contact between the sensor and the side wall. Accordingly, the contact force is detectable with high accuracy and good responsiveness.

When the robot body travels in parallel to the side wall, the contact force exerted by the side wall acts in a direction orthogonal to the direction of advance of the robot body, so that the component, in the direction of advance of the robot body, of the contact force detected by the sensor is zero.

However, in the case where the robot body travels in a direction approaching the side wall, the contact force exerted by the side wall acts in a direction at an obtuse angle with the direction of advance of the robot body, and the component, in the direction of advance, of the contact force detected by the sensor changes from zero to a negative value.

Conversely when the robot body travels in a direction departing from the side wall, the force of contact exerted by the side wall acts in a direction at an acute angle with the direction of advance of the robot body, and the component, in the direction of advance, of the contact force detected by the sensor changes from zero to a positive value.

Accordingly, the robot body is allowed to travel in parallel to the side wall by so controlling the steering device that the component of the contact force in the direction of advance of the robot body becomes zero.

In the case where the robot body travels along a curved wall, the contact force is likely to increase temporarily if the course of travel is altered by the steering device in the above manner. In this case, the slide device is controlled so as to maintain the contact force at a target value or a value within a target range, with the result that an abrupt change in the contact force is mitigated by rapid operation of the slide device to preclude damage to the contact force sensor or to the wall.

With the cleaning robot embodying the present invention described, the distance of the robot body from the side wall is accurately controlled based on the contact force exerted by the side wall when the robot body travels along the wall. This makes it possible to reduce the distance to the greatest possible extent, consequently enabling the robot body to clean every nook and corner in the vicinity of the side wall.

DETAILED DESCRIPTION OF EMBODIMENT

A cleaning robot embodying the present invention will be described in detail with reference to the drawings concerned.

Figure 1:
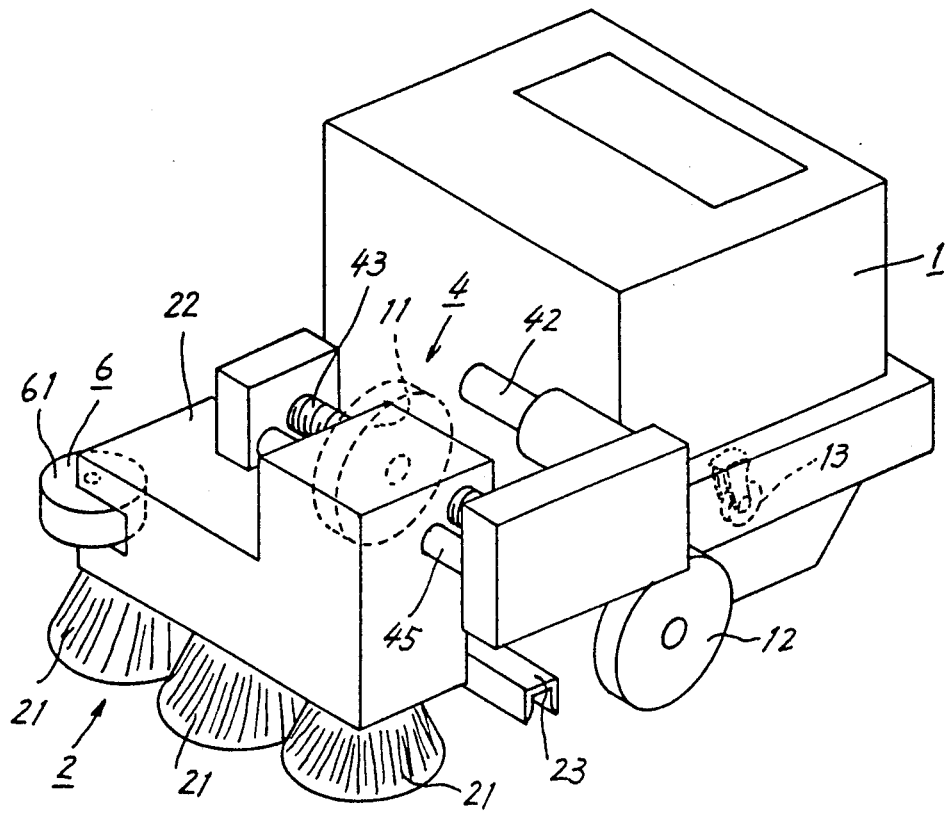
FIG. 1 is a perspective view showing the appearance of a cleaning robot embodying the invention.

As shown in FIG. 1, a robot body 1 has a right drive wheel 11 and a left drive wheel 12 at its respective opposite sides, and a caster 13 on its bottom side. A right wheel motor and a left wheel motor (not shown) are coupled to the drive wheels to provide a self-propelling mechanism and a steering device to be described later.

The robot body 1 is provided at its front with a slide device 4 carrying a cleaning mechanism 2. The cleaning mechanism 2 comprises a plurality of rotary brushes 21 provided inside a housing 22 which is reciprocating driven rightward and leftward by the slide device 4. The brushes 21 are arranged in the direction of movement of the housing and have their bottom portions projected from a bottom opening of the housing 22. A squeegee 23 is provided to the rear of the rotary brushes 21.

With the travel of the robot body 1, the rotary brushes 21 clean a floor, and the soiled water resulting from cleaning and dust are scraped off by the squeegee 23 and drawn into the robot body 1 by suction.

Figure 3:
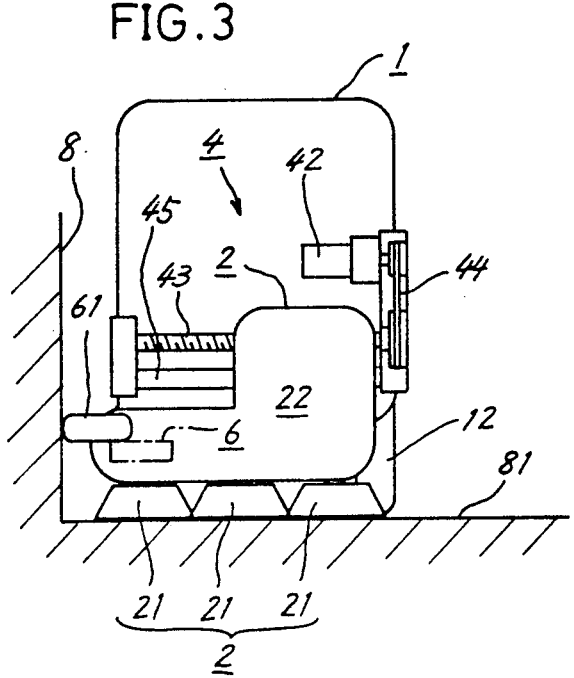
FIG. 3 is a front view showing the body of the robot as positioned close to a side wall.
Figure 4:
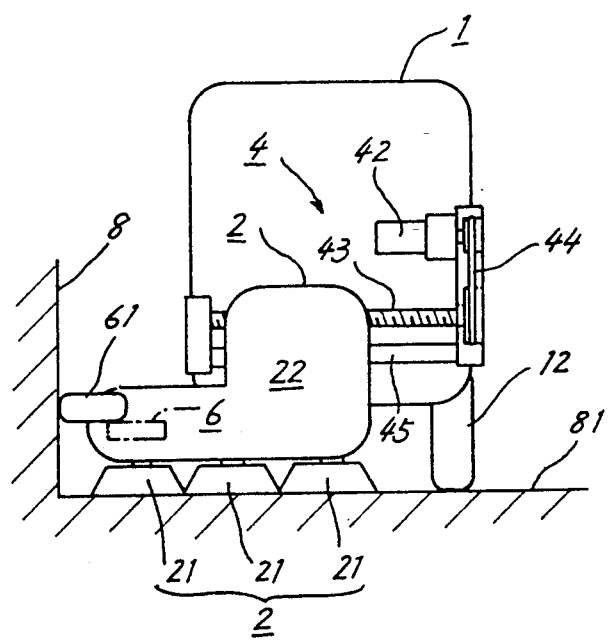
FIG. 4 is a front view showing the robot body as positioned away from the side wall.

With reference to FIGS. 1, 3 and 4, a ball screw 43 and a guide shaft 45 are horizontally mounted on the front portion of the robot body 1. A slide motor 42 is coupled to the ball screw 43 by a power transmission 44. The housing 22 of the cleaning mechanism 2 is guided for reciprocating movement by the guide shaft 45, and reciprocatingly driven in parallel to the floor 81 by the ball screw 43.

Figure 5:
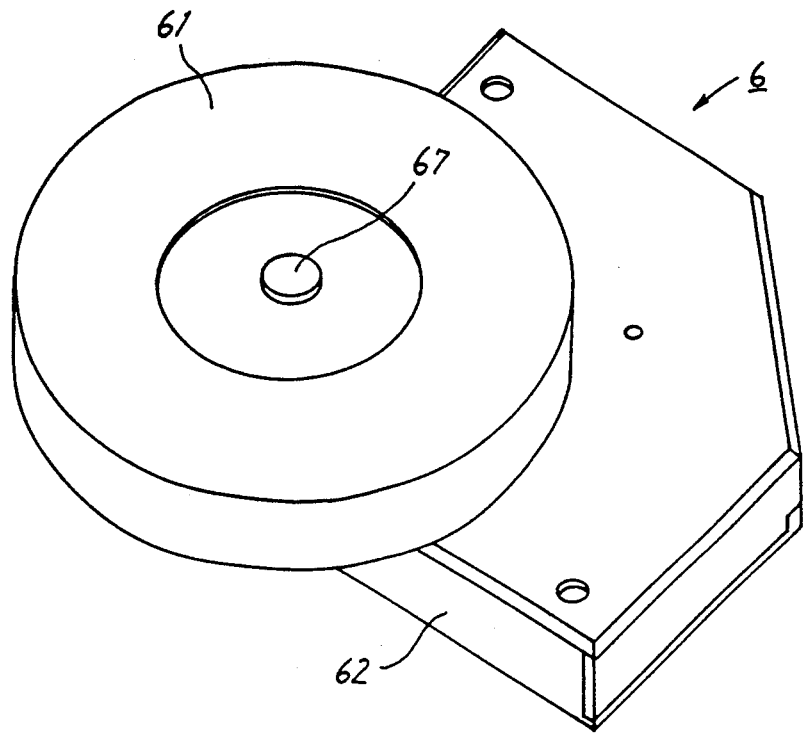
FIG. 5 is a perspective view showing the appearance of a contact force sensor.
Figure 6:
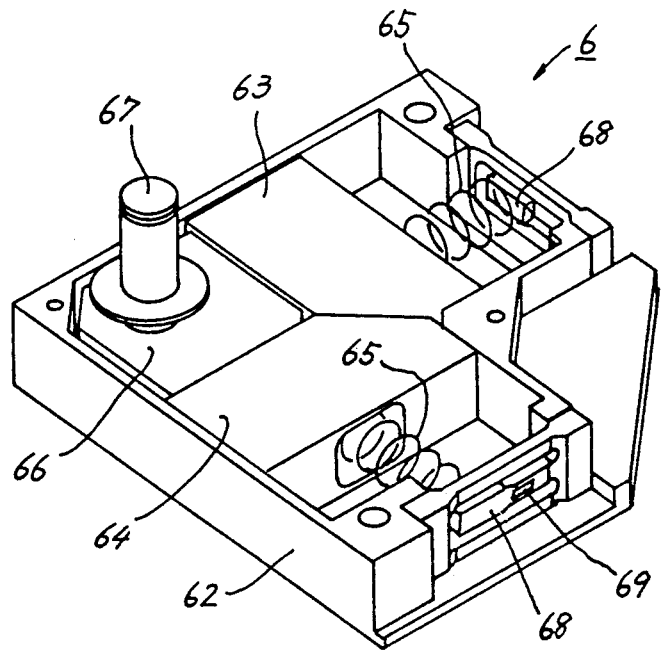
FIG. 6 is a perspective view showing the internal construction of the contact force sensor.
Figure 7:
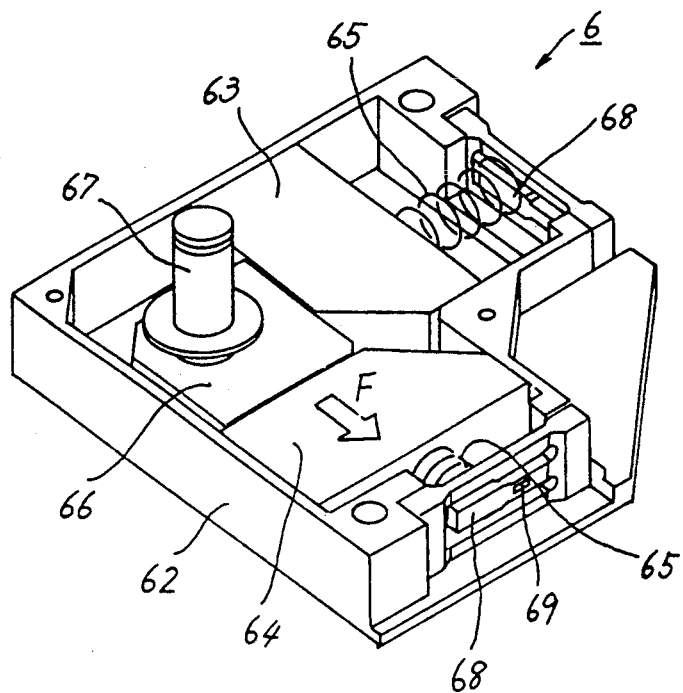
FIG. 7 is a perspective view showing the same while the sensor is subjected to a contact force.

As shown in FIG. 1, a contact force sensor 6 having a roller 61 to be in contact with a wall 8 on the floor 81 is mounted on the right front corner of the housing 22. As seen in FIGS. 5 to 7, the sensor 6 comprises a first slide member 63 and a second slide member 64 which are mounted on a base member 62 at the central portion thereof and which are slidable in directions orthogonal to each other. The base member 62 carries on a corner portion thereof a slide piece 66 slidably in contact with side faces of both the slide members 63, 64 at the same time and slidable in a desired direction. The roller 61 is mounted on a shaft 67 provided upright on the slide piece 66.

Arranged on the base member 62 are springs 65, 65 for biasing the first slide member 63 and the second slide member 64, respectively, toward the slide piece 66. One end of each spring is engaged with a side face of the slide member.

Figure 8:
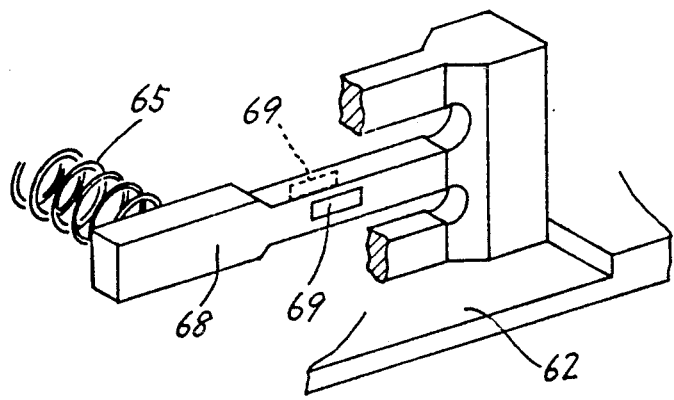
FIG. 8 is a perspective view partly broken away and showing strain gauges as disposed inside the contact force sensor.

The base member 62 is further provided with two elastic arms 68, 68 extending horizontally and opposed to the side faces of the respective slide members 63, 64. As seen in FIG. 8, each elastic arm 68 is in the form of a cantilever and has a base end fixed to the base member 62 and a free end in engagement with the other end of the spring. A pair of strain gauses 69, 69 are affixed to the respective opposite side faces of the elastic arm 68.

When a contact force F acts on the roller 61, moving, for example, the second slide member 64 as shown in FIG. 7, the spring 65 connected to the second slide member 64 is compressed, and the compressive force acts on the elastic arm 68. As a result, the elastic arm 68 elastically deforms in corresponding relation with the contact force F, and the amount of deformation is detected by the strain gauses 69.

When both the first slide member 63 and the second slide member 64 move, the amounts of deformation of the two elastic arms 68, 68 are individually detected.

Figure 9A:
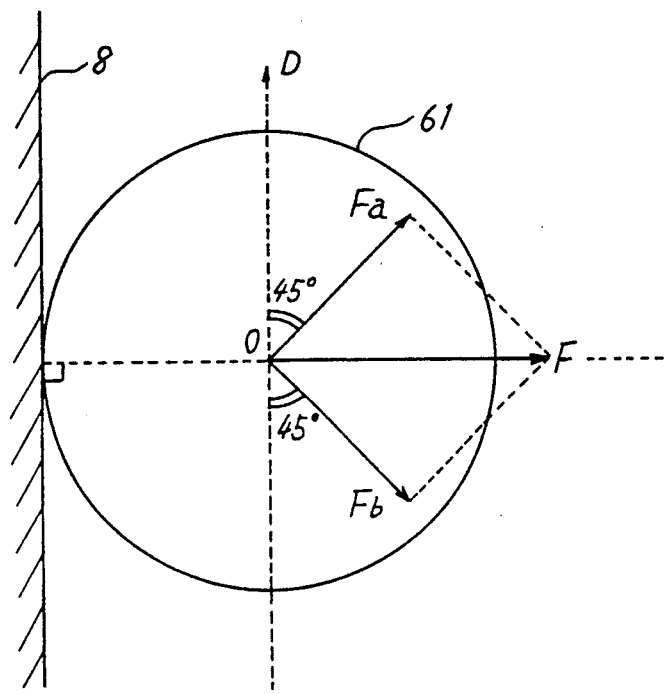
FIG. 9A is a vector diagram showing the direction in which a contact force acts and components thereof during the travel of the robot body in parallel to the side wall.

Accordingly, the contact force F exerted on the roller 61 by the side wall 8 as shown in FIG. 9A can be measured by arithmetically processing the outputs of the strain gauses 69 in a known manner. The contact force sensor 6 is mounted on the slide device 4 in such a posture that the directions of sliding movement of the first slide member 63 and the second slide member 64 coincide with two directions symmetric with the direction of slide of the slide device 4 and each at an angle of 45 degrees therewith.

Thus, when the direction of advance of the robot is parallel to the side wall 8 as indicated in a broken line D in FIG. 9A, a force component Fa detected with the sliding movement of the first slide member 63 is equal to a force component Fb detected with the sliding movement of the second slide member 64.

Figure 9B:
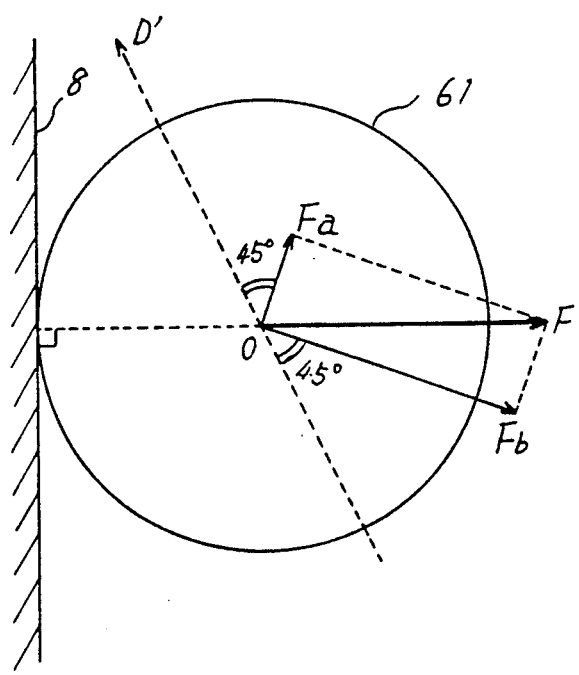
FIG. 9B is a vector diagram showing the same during the travel of the robot body in a direction approaching the side wall.

On the other hand, when the direction of advance of the robot is inclined with respect to the side wall 8 as indicated by a broken line D' in FIG. 9B, a difference corresponding to the angle of inclination of the robot with respect to the side wall occurs between the force component Fa detected with the sliding movement of the first slide member 63 and the force component Fb detected with the sliding movement of the second slide member 64.

Figure 2:
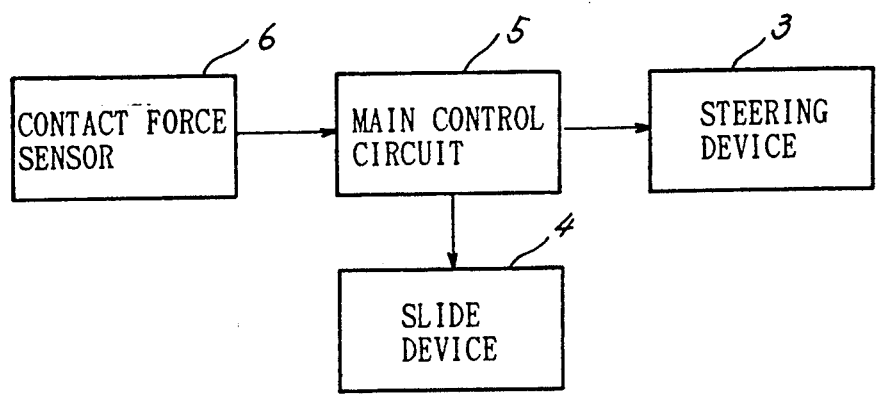
FIG. 2 is a block diagram showing the main construction of the cleaning robot.

The output of the contact force sensor 6 is fed to a main control circuit 5 for use in controlling the steering device 3 and the slide device 4 as shown in FIG. 2.

Figure 12:
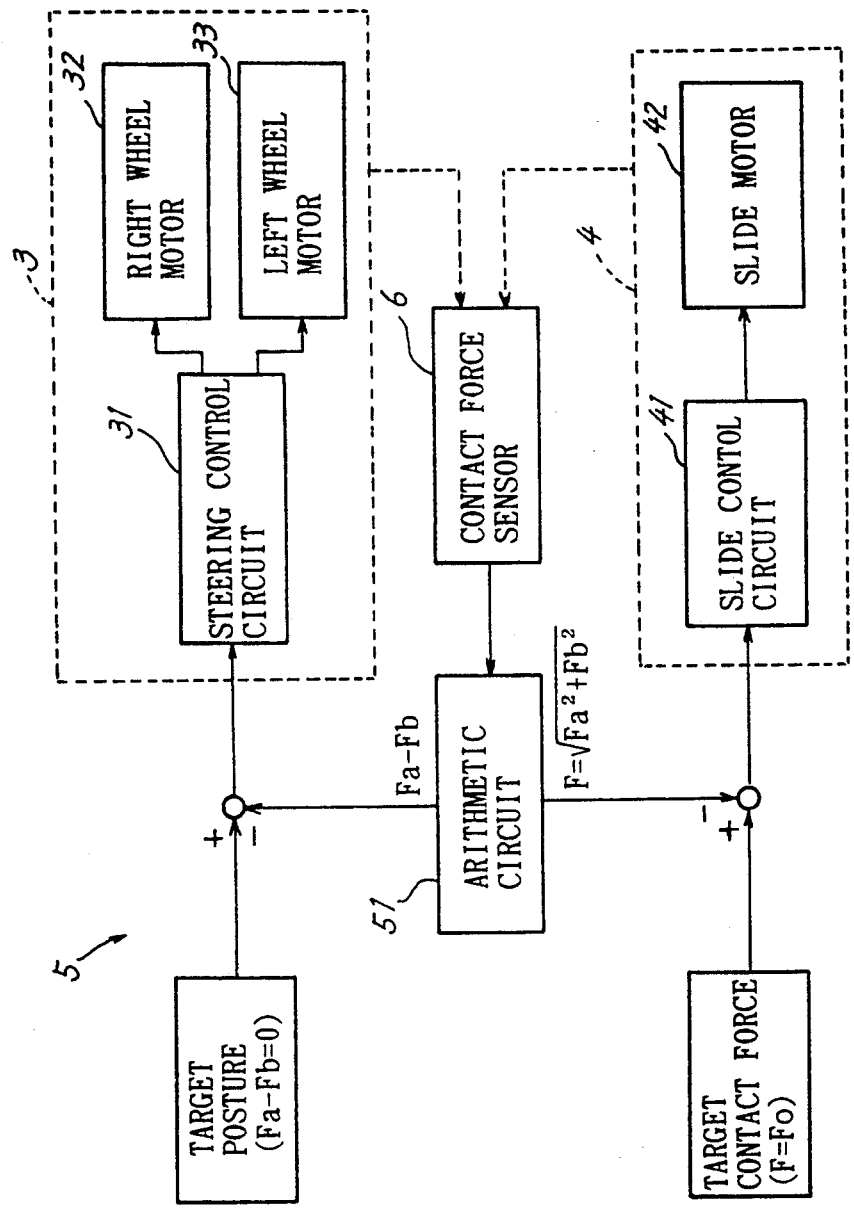
FIG. 12 is a control block diagram of the cleaning robot.

FIG. 12 is a control block diagram showing the operation of the main control circuit 5.

The aforementioned right wheel motor 32 and left wheel motor 33 constituting the steering device 3 are respectively controlled for rotation by a steering control circuit 31. The above-mentioned slide motor 42 constituting the slide device 4 has its rotation controlled by a slide control circuit 41.

The output of the contact force sensor 6 is fed to an arithmetic circuit 51, which calculates the difference (Fa−Fb) between the two force components Fa, Fb, and the resultant force F of these components.

The deviation (0−(Fa−Fb)) of the difference between the components, (Fa−Fb), from the value ("0") when the robot is in a target posture, i.e., when the direction of advance of the robot is parallel to the side wall, is calculated, and the deviation is fed to the steering control circuit 31.

The steering control circuit 31 in turn controls the rotation of the right wheel motor 32 and the left wheel motor 33 so that the deviation reduces to zero, that is, the two components become equal, whereby the direction of advance of the robot is corrected.

On the other hand, the deviation (F−F0) of the resultant force F from a predetermined target contact force (F0) is calculated, and the deviation is fed to the slide control circuit 41.

Based on the input, the slide control circuit 41 controls the rotation of the slide motor 42 so that the deviation reduces to zero, namely, so that the resultant force F becomes equal to the target contact force F0, whereby the amount of slide of the slide device 4 is corrected.

Figure 13:
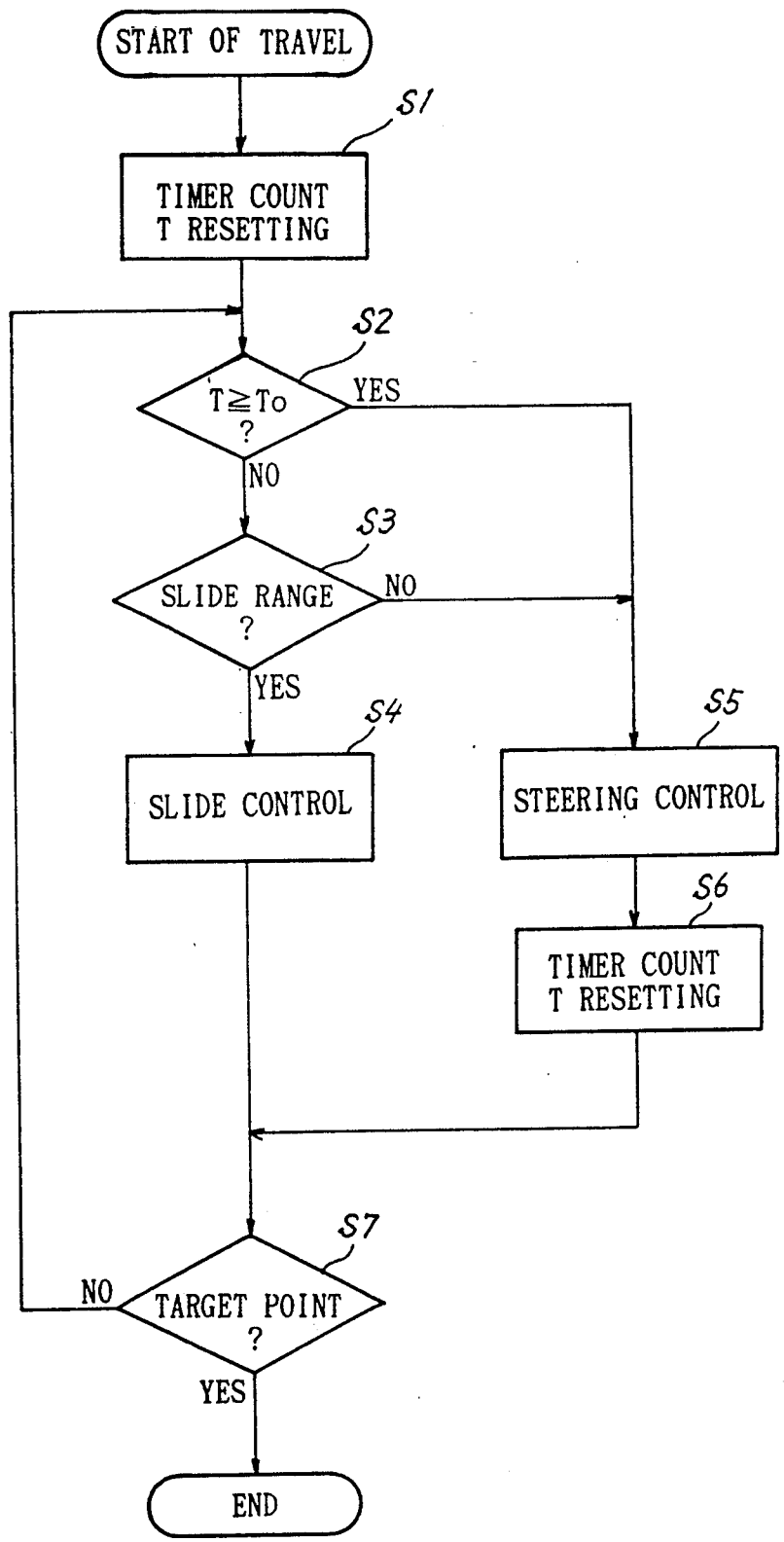
FIG. 13 is a flow chart showing a control procedure.

FIG. 13 shows a control change-over process for realizing steering control by the steering control circuit 31 and slide control by the slide control circuit 41 according to a computer program.

First, timer count T is reset in step S1 to start a time measuring operation. Next in step S2, the timer count T is checked as to whether a specified period of time T0 (e.g., 10 ms) has elapsed. If the answer is NO, an inquiry is made in step S3 as to whether the slide device 4 has a margin in the amount of slide. If the answer is YES, step S4 follows to execute the slide control described.

Alternatively when the inquiry of step S2 is answered in the affirmative, or when the answer to the inquiry of step S3 is NO, the steering control described is executed in step S5, followed by step S6 to reset the timer count T and start to measure the specified time period T0 again.

After the slide control of step S4, step S7 inquires whether the robot has reached a target point. If the answer is NO, the sequence returns to step S2. If the anwer is YES, the control procedure is terminated.

According to the control procedure described, steering control is repeated with the specified period of T0 (e.g., 10 mc) to correct the direction of advance of the robot. Further only when there is a margin in the amount of slide of the slide device 4 within the specified period T0, slide control is effected little by little to adjust the amount of slide of the device 4.

During a change in the direction of advance of the robot body 1, the robot body 1 may be positioned at a small distance from the side wall 8 as shown in FIG. 3 or at a large distance therefrom as seen in FIG. 4, whereas the operation of the slide device 4 holds the roller 61 in contact with the side wall 8 at all times and also holds the cleaning mechanism 2 at a position as close to the side wall 8 as possible.

Figure 14:
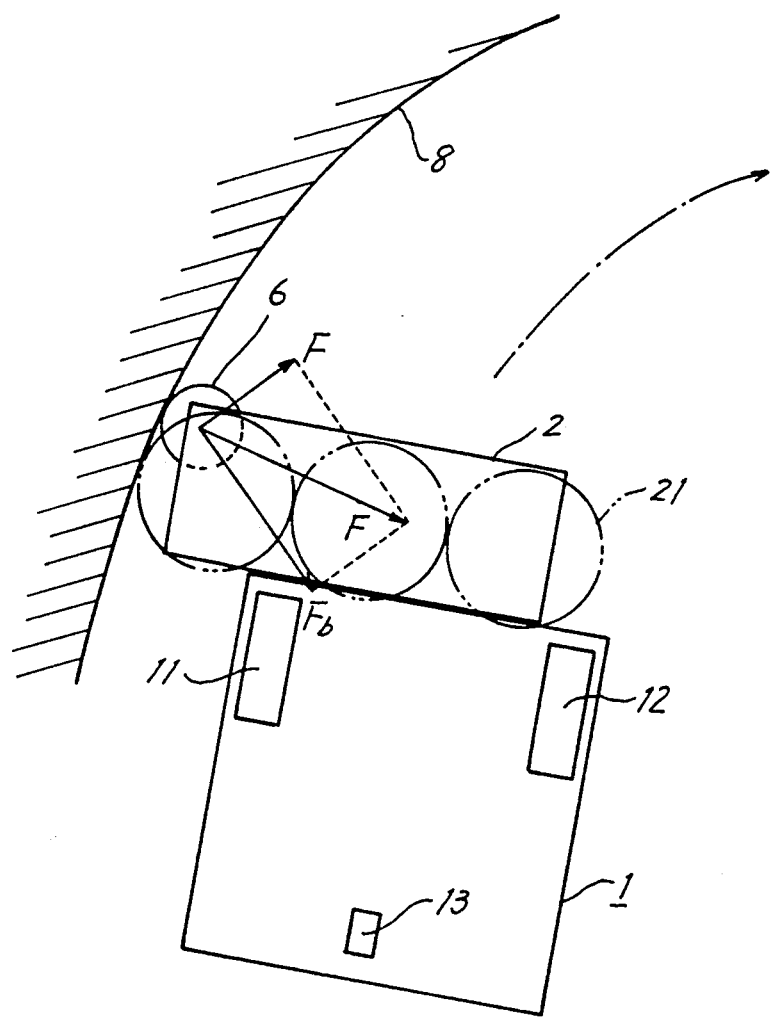
FIG. 14 is a rear view of the cleaning robot as it travels along a bent side wall.
Figure 15:
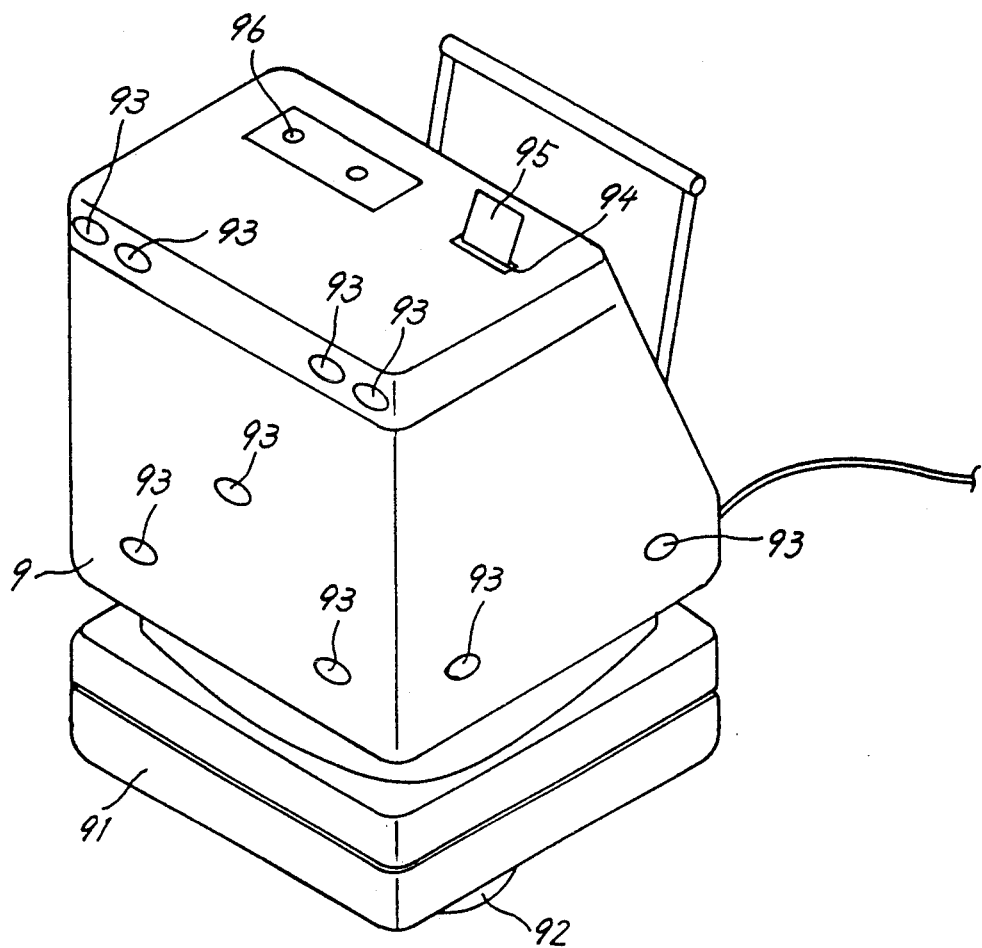
FIG. 15 is a perspective view showing the appearance of a conventional cleaning robot.

Consequently, even when the side wall 8 is curved as shown in FIG. 14, the direction of advance of the robot body 1 is altered automatically, with the cleaning mechanism 2 advanced to a position close to the side wall 8 to clean the corner portion in the vicinity of the side wall 8.

When the cleaning robot is to clean the central portion of the room at a large distance from the side wall 8, the operation mode is changed to discontinue slide control and change over the steering control operation based on the output of the contact force sensor 6 to steering control along a predetermined path of travel.

Figure 10:
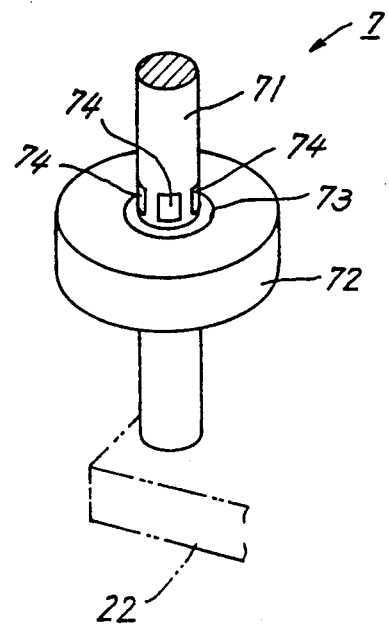
FIG. 10 is a perspective view showing a contact force sensor of different construction.

The foregoing construction of the contact force sensor 6 is not limitative. For example, a contact force sensor 7 is usable which has the construction shown in FIGS. 10 and 11. The sensor 71 comprises a roller 72 mounted by a bearing 73 on a post 71 fixed to the housing 22, and four strain gauses 74 affixed to the periphery of the post 71 and arranged at an angular spacing of 90 degrees.

Figure 11:
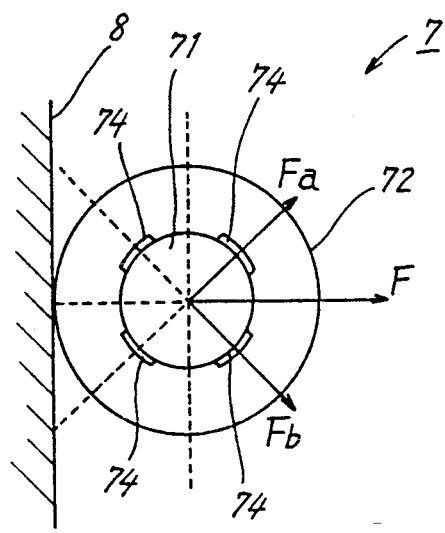
FIG. 11 is a vector diagram showing a contact force acting on the sensor.

As shown in FIG. 11, the contact of the roller 72 with the side wall 8 produces a bending stress in the post 71. This stress is detected by the four strain gauges 74.

The two strain gauges 74, 74 positioned at opposite sides of center of the post 71 and opposed to each other diametrically thereof serve as a pair, and two such pairs detect the two components Fa, Fb of the contact force F, respectively.

The contact force sensor 6 need not alway be used singly. For example, the sensor 6 can be provided at each of opposite ends of the slide device 4 to control travel along a left side wall based on the output of the contact force sensor on the left side and control travel along a right side wall based on the output of the right sensor.

The foregoing description of the embodiment has been given to illustrate the present invention and should not be construed as limiting the invention as defined in the appended claims or reducing the scope thereof. The components of the invention are not limited in construction to those of the embodiment but can of course be modified variously by one skilled in the art without departing from the spirit of the invention as defined in the claims.

What is claimed is:

1. A cleaning robot having a robot body to be self-propelled on a floor along a side wall, and a cleaning mechanism mounted on the robot body, the cleaning robot being characterized in that the robot comprises:
    a steering device provided on the robot body for changing the direction of advance of the robot body,
    a slide device mounted on the robot body and reciprocatingly movable toward and away from the side wall,
    a contact force sensor provided at an end of the slide device and positionable in contact with the side wall for detecting a force of contact exerted thereon by the side wall,
    slide control means for controlling the slide device based on a detection signal from the contact force sensor so as to maintain the contact force at a target value or at a value within a target range, and
    steering control means for controlling the steering device based on the detection signal from the contact force sensor so as that a component of the contact force in the direction of advance of the robot body becomes substantially zero.

2. A cleaning robot as defined in claim 1 wherein the cleaning mechanism is attached to the slide device and is movable toward and away from the side wall by the movement of the slide device.

3. A cleaning robot as defined in claim 1 wherein the contact force sensor has a structure for detecting force components in two directions symmetric with respect to the direction of slide of the slide device and each inclined at an angle of 45 degrees therewith, and the slide control means calculates the resultant force of the two components as the force of contact, the steering control means being operable to compare the two force components in magnitudes and change the direction of advance of the robot body toward a direction in which the two force components become equal to each other.

4. A cleaning robot as defined in claim 1 wherein the steering control means repeatedly alters the direction of advance with a specified period, and the slide control means varies the amount of slide of the slide device when there is a margin in the amount of slide within the specified period.

* * * * *